US011614972B2

(12) United States Patent
Obstfeld et al.

(10) Patent No.: US 11,614,972 B2
(45) Date of Patent: Mar. 28, 2023

(54) DISTRIBUTED PROCESSING OF NETWORK DEVICE TASKS

(71) Applicant: Juniper Networks, Inc., Sunnyvale, CA (US)

(72) Inventors: Joel Obstfeld, Bushey (GB); David Ward, Los Gatos, CA (US); Colby Barth, Collegeville, PA (US); Mu Lin, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1168 days.

(21) Appl. No.: 16/041,261

(22) Filed: Jul. 20, 2018

(65) Prior Publication Data
US 2018/0329755 A1 Nov. 15, 2018

Related U.S. Application Data

(63) Continuation of application No. 13/533,780, filed on Jun. 26, 2012, now Pat. No. 10,031,782.

(51) Int. Cl.
*G06F 9/50* (2006.01)
*G06F 9/455* (2018.01)

(52) U.S. Cl.
CPC ........ *G06F 9/5044* (2013.01); *G06F 9/45558* (2013.01); *G06F 2009/45595* (2013.01)

(58) Field of Classification Search
CPC .............. G06F 9/5044; G06F 9/45558; G06F 2009/45595
See application file for complete search history.

(56) References Cited

U.S. PATENT DOCUMENTS

| 6,055,561 A | 4/2000 | Feldman et al. |
| 6,266,704 B1 | 7/2001 | Reed et al. |
| 6,339,595 B1 | 1/2002 | Rekhter et al. |
| 6,507,914 B1 | 1/2003 | Cain et al. |
| 6,594,268 B1 | 7/2003 | Aukia et al. |

(Continued)

FOREIGN PATENT DOCUMENTS

CN 102457439 A 5/2012

OTHER PUBLICATIONS

Response to Examination Report dated May 10, 2019, from counterpart European Application No. 13167218.0, filed Sep. 9, 2019, 11 pp.

(Continued)

*Primary Examiner* — George C Neurauter, Jr.
(74) *Attorney, Agent, or Firm* — Shumaker & Sieffert, P.A.

(57) ABSTRACT

Techniques are described for distributing network device tasks across virtual machines executing in a computing cloud. A network device includes a network interface to send and receive messages, a routing unit comprising one or more processors configured to execute a version of a network operating system, and a virtual machine agent. The virtual machine agent is configured to identify a virtual machine executing at a computing cloud communicatively coupled to the network device, wherein the identified virtual machine executes an instance of the version of the network operating system, to send, using the at least one network interface and to the virtual machine, a request to perform a task, and to receive, using the at least one network interface and from the virtual machine, a task response that includes a result of performing the task. The routing unit is configured to update the network device based on the result.

20 Claims, 4 Drawing Sheets

(56) References Cited

U.S. PATENT DOCUMENTS

| | | |
|---|---|---|
| 6,735,702 B1 | 5/2004 | Yavatkar et al. |
| 6,772,347 B1 | 8/2004 | Xie et al. |
| 6,775,280 B1 | 8/2004 | Ma et al. |
| 6,910,148 B1 | 6/2005 | Ho et al. |
| 6,950,424 B2 | 9/2005 | Galand et al. |
| 7,080,161 B2 | 7/2006 | Leddy et al. |
| 7,120,931 B1 | 10/2006 | Cheriton |
| 7,136,374 B1 | 11/2006 | Kompella |
| 7,139,242 B2 | 11/2006 | Bays |
| 7,154,889 B1 | 12/2006 | Rekhter et al. |
| 7,215,637 B1 | 5/2007 | Ferguson et al. |
| 7,298,693 B1 | 11/2007 | Owens et al. |
| 7,299,296 B1 | 11/2007 | Lo et al. |
| 7,330,435 B2 | 2/2008 | Guerin et al. |
| 7,382,769 B1 | 6/2008 | Rijsman |
| 7,412,701 B1 | 8/2008 | Mitra |
| 7,421,487 B1 | 9/2008 | Peterson et al. |
| 7,467,227 B1 | 12/2008 | Nguyen et al. |
| 7,551,627 B2 | 6/2009 | Scholl |
| 7,567,577 B2 | 7/2009 | Thubert et al. |
| 7,606,235 B1 | 10/2009 | Ayyangar et al. |
| 7,769,873 B1 | 8/2010 | Mackie |
| 7,773,596 B1 | 8/2010 | Marques |
| 7,814,495 B1* | 10/2010 | Lim .................... G06F 9/45558 |
| | | 718/104 |
| 7,860,097 B1 | 12/2010 | Lovett et al. |
| 7,929,524 B2 | 4/2011 | Yang et al. |
| 7,937,438 B1 | 5/2011 | Miller et al. |
| 7,940,753 B2 | 5/2011 | Dolganow |
| 8,078,758 B1 | 12/2011 | Callon |
| 8,139,492 B1 | 3/2012 | Peterson et al. |
| 8,281,400 B1 | 10/2012 | Eater et al. |
| 8,339,959 B1 | 12/2012 | Moisand et al. |
| 8,422,360 B2 | 4/2013 | Shimizu et al. |
| 8,451,846 B1 | 5/2013 | Ayyangar |
| 8,483,123 B2 | 7/2013 | Zheng et al. |
| 8,537,842 B2 | 9/2013 | Petersen |
| 8,560,660 B2 | 10/2013 | Kalusivalingam et al. |
| 8,576,720 B2 | 11/2013 | Cugini et al. |
| 8,606,847 B2 | 12/2013 | Raghunath et al. |
| 8,625,616 B2 | 1/2014 | Vobbilisetty et al. |
| 8,660,129 B1 | 2/2014 | Brendel et al. |
| 8,688,775 B2 | 4/2014 | Penno et al. |
| 8,693,974 B2 | 4/2014 | Peczalski |
| 8,700,801 B2 | 4/2014 | Medved et al. |
| 8,787,400 B2 | 7/2014 | Barth et al. |
| 8,787,983 B2 | 7/2014 | Kim |
| 8,804,745 B1* | 8/2014 | Sinn .................... H04L 12/4633 |
| | | 370/395.53 |
| 8,787,154 B1 | 9/2014 | Medved et al. |
| 8,824,274 B1 | 9/2014 | Medved et al. |
| 8,885,463 B1 | 11/2014 | Medved et al. |
| 8,953,590 B1 | 2/2015 | Aggarwal et al. |
| 9,438,508 B1 | 9/2016 | Medved et al. |
| 9,450,817 B1 | 9/2016 | Bahadur et al. |
| 9,705,781 B1 | 7/2017 | Medved et al. |
| 10,031,782 B2 | 7/2018 | Obstfeld et al. |
| 2002/0018264 A1 | 2/2002 | Kodialam et al. |
| 2002/0101819 A1 | 8/2002 | Goldstone |
| 2002/0165981 A1 | 11/2002 | Basturk et al. |
| 2002/0174207 A1 | 11/2002 | Battou |
| 2002/0198687 A1 | 12/2002 | Dewan et al. |
| 2003/0016672 A1 | 1/2003 | Rosen et al. |
| 2003/0076248 A1 | 4/2003 | Larson |
| 2003/0076840 A1 | 4/2003 | Rajagopal et al. |
| 2003/0103510 A1 | 6/2003 | Svanberg et al. |
| 2003/0118029 A1 | 6/2003 | Maher, III et al. |
| 2003/0118036 A1 | 6/2003 | Gibson et al. |
| 2003/0185217 A1 | 10/2003 | Ganti et al. |
| 2003/0212900 A1 | 11/2003 | Liu et al. |
| 2003/0218982 A1 | 11/2003 | Folkes et al. |
| 2005/0169313 A1 | 8/2005 | Okamura et al. |
| 2005/0175341 A1 | 8/2005 | Ovadia |
| 2006/0092952 A1 | 5/2006 | Boutros et al. |
| 2006/0153067 A1 | 7/2006 | Vasseur et al. |
| 2007/0165515 A1 | 7/2007 | Vasseur |
| 2008/0005297 A1* | 1/2008 | Kjos .................... G06F 9/45558 |
| | | 709/223 |
| 2008/0013551 A1* | 1/2008 | Scholl .................... H04L 45/04 |
| | | 370/401 |
| 2008/0037562 A1 | 2/2008 | Saleh et al. |
| 2008/0137655 A1 | 6/2008 | Kim et al. |
| 2008/0183861 A1* | 7/2008 | Beverly .................... H04L 69/16 |
| | | 709/224 |
| 2008/0201748 A1 | 8/2008 | Hasek et al. |
| 2009/0113111 A1* | 4/2009 | Chen .................... G06F 12/1009 |
| | | 711/6 |
| 2009/0116483 A1 | 5/2009 | Anumala et al. |
| 2009/0122718 A1 | 5/2009 | Klessig et al. |
| 2009/0204723 A1 | 8/2009 | Tonsing et al. |
| 2009/0232031 A1 | 9/2009 | Vasseur et al. |
| 2009/0238074 A1 | 9/2009 | Vasseur et al. |
| 2009/0300414 A1* | 12/2009 | Huang .................... G06F 9/45558 |
| | | 714/11 |
| 2010/0107162 A1 | 4/2010 | Edwards et al. |
| 2010/0322255 A1* | 12/2010 | Hao .................... H04L 45/00 |
| | | 370/398 |
| 2010/0325191 A1* | 12/2010 | Jung .................... G06F 15/16 |
| | | 709/202 |
| 2011/0044352 A1 | 2/2011 | Chaitou et al. |
| 2011/0047262 A1 | 2/2011 | Martin et al. |
| 2011/0078230 A1 | 3/2011 | Sepulveda |
| 2011/0110226 A1 | 5/2011 | Lu et al. |
| 2011/0110368 A1 | 5/2011 | Matsumoto |
| 2011/0145621 A1 | 6/2011 | Albano et al. |
| 2011/0202651 A1 | 8/2011 | Hilt et al. |
| 2011/0286452 A1 | 11/2011 | Balus et al. |
| 2012/0092986 A1 | 4/2012 | Chen |
| 2012/0158938 A1 | 6/2012 | Shimonishi et al. |
| 2012/0185914 A1* | 7/2012 | Delco .................... G06F 9/45558 |
| | | 726/1 |
| 2013/0003728 A1 | 1/2013 | Kwong et al. |
| 2013/0007216 A1* | 1/2013 | Fries .................... G06F 9/4856 |
| | | 709/218 |
| 2013/0007254 A1 | 1/2013 | Fries |
| 2013/0007266 A1 | 1/2013 | Jocha et al. |
| 2013/0016605 A1 | 1/2013 | Chen |
| 2013/0060929 A1 | 3/2013 | Koponen et al. |
| 2013/0070638 A1 | 3/2013 | Iovanna et al. |
| 2013/0103827 A1 | 4/2013 | Dunlap et al. |
| 2013/0159376 A1 | 6/2013 | Moore |
| 2013/0159548 A1 | 6/2013 | Vasseur et al. |
| 2013/0185432 A1 | 7/2013 | So et al. |
| 2013/0238785 A1* | 9/2013 | Hawk .................... G06F 9/5077 |
| | | 709/224 |
| 2013/0247034 A1* | 9/2013 | Messerli .................... G06F 9/45533 |
| | | 718/1 |
| 2013/0247061 A1 | 9/2013 | Kiehn |
| 2013/0308444 A1 | 11/2013 | Sem-Jacobsen et al. |
| 2013/0329601 A1 | 12/2013 | Yin et al. |
| 2013/0332602 A1 | 12/2013 | Nakil et al. |
| 2013/0332935 A1* | 12/2013 | Varma .................... G06F 9/5011 |
| | | 718/104 |
| 2013/0336159 A1 | 12/2013 | Previdi et al. |
| 2014/0016477 A1 | 1/2014 | Yedavalli et al. |
| 2014/0098710 A1 | 4/2014 | Ong |
| 2014/0122683 A1 | 5/2014 | Zhao et al. |
| 2014/0192645 A1 | 7/2014 | Zhang et al. |
| 2014/0204731 A1 | 7/2014 | Ye |
| 2014/0269724 A1 | 9/2014 | Mehler et al. |
| 2014/0328587 A1 | 11/2014 | Magri et al. |
| 2015/0003283 A1 | 1/2015 | Previdi et al. |
| 2015/0030026 A1 | 1/2015 | Kumar et al. |
| 2015/0109907 A1 | 4/2015 | Akiya et al. |
| 2015/0146536 A1 | 5/2015 | Minei et al. |
| 2015/0312055 A1 | 10/2015 | Varga et al. |
| 2015/0351138 A1 | 12/2015 | Metsala et al. |

OTHER PUBLICATIONS

Choi et al. "An Extensible Design of a Load-Aware Virtual Router Monitor in User Space" 40th International Conference on Parallel (56) References Cited

OTHER PUBLICATIONS

Processing Workshops (ICPPW), available at http://www.cse.cuhk.edu.hk/~pclee/www/pubs/srmpds11.pdf (accessed Jun. 25, 2012), 2011, 10 pgs.
ChinaV: Building Virtualized Computing System by Hai Jin—Published on 2008 from the 10th IEEE International Conference on High Performance Computing and Communications.
Response to Communication pursuant to Rule 69 EPC dated Aug. 22, 2016, from counterpart European Application No. 13167218.0, filed on Jan. 31, 2017, 11 pp.
"OpenFlow Switch Specification, Version 1.1.0 Implemented (Wire Protocol 0x02)," Openflow Consortium, Feb. 28, 2011, found at http://www.openflow.org/documents/openflow-spec-v1.1.0.pdf, 56 pp.
Alimi et al., "ALTO Protocol, draft-ielf-alto-protocol-06.txt," ALTO WG Internet-Draft, Oct. 25, 2010, 66 pp.
Alverez et al., "PCE Path Profiles, draft-alvarez-pee-path-profiles-00," Internet Engineering Task Force, Internet-Draft, Oct. 22, 2013, 9 pp.
Ash et al., "Path Computation Element (PCE) Communication Protocol Generic Requirements," Network Working Group, RFC 4657, Sep. 2006, 22 pp.
Atlas et al., "Interface to the Routing System Framework, draft-ward-irs-framework-00," Network Working Group, Internet-Draft, Jul. 30, 2012, 22 pp.
Awduche et al., "RSVP-TE: Extensions to RSVP for LSP Tunnels," Network Working Group, RFC 3209, Dec. 2001, 61 pp.
Bryant et al., "Pseudo Wire Emulation Edge-to-Edge (PWE3) Architecture," Network Working Group, RFC 3985, Mar. 2005, 40 pp.
Bryskin et al., "Policy-Enabled Path Computation Framework," Network Working Group, RFC 5394, Dec. 2008, 37 pp.
Chamania et al., "Lessons Learned From Implementing a Path Computation Element (PCE) Emulator," Optical Scoeity of America, Optical Fiber Communication and Exposition, Mar. 6-10, 2011, 3 pp.
Crabbe et al., "PCEP Extensions for PCE-initiated LSP Setup in a Stateful PCE Model, draft-crabbe-pce-pce-initiated-isp-03," Network Working Group, Internet-Draft, Oct. 10, 2013, 17 pp.
Crabbe et al., "PCEP Extensions for PCE-initiated LSP Setup in a Stateful PCE Model, draft-crabbe-pce-pce-initiated-isp-00," Network Working Group, Internet-Draft, Oct. 9, 2012, 14 pp.
Crabbe et al., "PCEP Extensions for Stateful PCE, draft-crabbe-pce-stateful-pce-00," Network Working Group, Internet-Draft, Oct. 16, 2011, 40 pp.
Crabbe et al., "PCEP Extensions for Stateful PCE, draft-ielf-pce-stateful-pce-02," Network Working Group, Internet-Draft, Oct. 15, 2012, 49 pp.
Crabbe et al., "PCEP Extensions for Stateful PCE, draft-crabbe-pce-stateful-pce-00," Network Working Group, Internet-Draft, Sep. 10, 2011, 34 pp.
Crabbe et al., "PCEP Extensions for Stateful PCE, draft-ielf-pce-stateful-pce-07," PCE Working Group, Internet-Draft, Oct. 8, 2013, 47 pp.
Farrel et al., "A Path Computation Element (PCE)—Based Architecture," Network Working Group, RFC 4655, Aug. 2006, 41 pp.
Gibson, "DRDoS: Distributed Reflection Denial of Service, Description and analysis of a potent, increasingly prevalent, and worrisome Internet attack," Gibson Research Corporation, Feb. 22, 2002, 23 pp. www.grc.com/dos/drdos.htm.
Bates, "Multiprotocol Extensions for BGP-4," Network Working Group, IETF, RFC 4760, Jan. 2007.
Lee et al., "Path Computation Element Communication Protocol (PCEP) Requirements and Protocol Extensions in Support of Global Concurrent Optimization," Network Working Group, RFC 5557, Jul. 2009, 27 pp.
Lougheed et al., "A Border Gateway Protocol (BGP)," Network Working Group, RFC 1105, Jun. 1990, 37 pp.
McKeown et al., "OpenFlow: Enabling Innovation in Campus Networks," Whitepaper from Stanford University, Mar. 14, 2008, 6 pp.
Miyazawa et al., "Traffic Engineering Database Management Information Base in support of MPLS-TE/GMPLS, draft-ietf-ccamp-gmpls-ted-mib-09.txt," Network Working Group, Internet-Draft, Jul. 11, 2011, 33 pp.
Marques et al., "Dissemination of flow specification rules, draft-marques-idr-flow-spec-00.txt," Network Working Group, Internet-draft, Jun. 2003, 10 pp.
Oki et al., "Framework for PCE-Based Inter-Layer MPLS and GMPLS Traffic Engineering," Network Working Group, RFC 5623, Sep. 2009, 35 pp.
Sahni et al., "Bandwidth Scheduling and Path Computation Algorithms for Connection-Oriented Networks," Sixth International Conference on Networking, Apr. 22-28, 2007, 16 pp.
Masseur et al., "Path Computation Element (PCE) Communication Protocol (PCEP)," Network Working Group, RFC 5440, Mar. 2009, 88 pp.
Marques et al., "Dissemination of Flow Specification Rules," Network Working Group, RFC 5575, Aug. 2009, 23 pp.
Seedorf et al. "Application-Layer Traffic Optimization (ALTO) Problem Statement," Network Working Group, RFC 5693, Oct. 2009, 15 pp.
Extended Search Report from counterpart European Application No. 13167218.0, dated Jul. 14, 2016, 8 pp.
U.S. Appl. No. 15/256,861, by Juniper Networks, Inc. (Inventors: Medved et al.), filed Sep. 6, 2016.
Prosecution History from U.S. Appl. No. 13/533,780, dated Apr. 17, 2014 through Jun. 18, 2018, 165 pp.
Communication pursuant to Article 94(3) EPC dated May 10, 2019 in counterpart EP Application No. 13167218.0, 8 pp.
Summons to Attend Oral Proceedings Pursuant to Rule 115(1) EPC from counterpart European Application No. 13167218.0, dated Dec. 18, 2020, 10 pp.

\* cited by examiner

DISTRIBUTED PROCESSING OF NETWORK DEVICE TASKS

This application is a continuation of U.S. application Ser. No. 13/533,780, filed Jun. 26, 2012, the entire content of which is hereby incorporated by reference.

TECHNICAL FIELD

The disclosure relates to computer networks and, more particularly, to techniques for distributing network device tasks across virtual machines.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, contain routing unit s that maintain routing information describing routes through the network. Each route defines a path between locations on the network. From the routing information, a forwarding engine of the routers generates forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" via which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or to indicate routes that are no longer available. However, updating the routing information and performing other administrative tasks may consume significant computing resources, limiting the amount of computing resources available to forward traffic.

Conventionally, network administrators scale up the computing resources by adding processors, memory, etc. However, the number of computing resources that can be added within a single chassis is limited. As the number of processors and other computing resources increase, the amount of heat produced and the amount of electricity required also increase. The cooling and power capabilities of a single chassis of a network device may be overwhelmed, which has resulted in network administrators using a separate chassis to provide the additional computing power required to maintain the desired network throughput while the network device performs the various administrative tasks. The network administrator must manage each additional chassis as a separate device, increasing the complexity of managing the network devices. Further, the operating system executing on the network device can only support up to a maximum number of computing resources and software processes, limiting the total computing capacity that may be available to any network device.

SUMMARY

In general, the techniques of this disclosure are directed to increasing the computing resources available to a network device by enabling the network device to off-load tasks to one or more virtual machines executing in a computing cloud that is communicatively coupled to and managed separately from the network device. The network device executes an operating system that provides the software functionality of the network device. Each virtual machine executes its own instance of an operating system that corresponds to the operating system executed by the network device. A virtual machine manager registers the various virtual machines executing in the computing cloud. When the network device requests computing resources from the computing cloud, the virtual machine manager identifies one or more virtual machines capable of performing the tasks requested by the network device and establishes a network socket between the virtual machine and the network device. The network device sends task requests to the virtual machine and the virtual machine returns the results of the task to the network device. In this manner, the network device selectively offloads tasks to a virtual machine, freeing up computing resources of the network device to forward packets and perform other latency-sensitive tasks.

The virtual machines executing in the computing cloud may each execute a particular version of a network operating system, enabling the computing cloud to provide support for many different network devices and many different versions of network devices. Further, two or more different virtual machines may execute a particular version of a network operating system. By executing multiple instances of the operating system in separate virtual machines, the amount of computing resources available to the network device is bound by the capacity of the computing cloud, not by the limitations of the operating system. Thus, as the need for additional computing resources increases, the computing resources of the computing cloud and the number of virtual machines can be increased without being restricted by the limitations of the operating system or specification of the network device, including resource, cooling, and power limitations.

In one embodiment, a method includes receiving, with a network device, a plurality of link-state messages from a plurality of other network devices communicatively coupled to the network device, sending, with a virtual machine agent executing at a network device and to a virtual machine manager executing at a computing cloud, a request for available computing resources of the computing cloud, and receiving, from the virtual machine manager, a response that includes a network socket to at least one virtual machine executing at the computing cloud. The method also includes sending, with the virtual machine agent and to the virtual machine using the network socket, a request to determine shortest paths between the network device and each of the plurality of other network devices, wherein the request includes the plurality of link-state messages, receiving, from the virtual machine, a response message that includes an indication of a respective shortest path between the network device and each of the plurality of other network devices, and updating, based on the response message, routing information stored at the network device.

In another embodiment, a method includes executing, by a network device, a version of a network operation system, and identifying, with a virtual machine agent executing at the network device, a virtual machine executing at a computing cloud communicatively coupled to the network device, wherein the identified virtual machine executes an instance of the version of the network operating system. The method further includes sending, with the virtual machine agent to the virtual machine, a request to perform a task, receiving, with the virtual machine agent and from the virtual machine, a task response that includes a result of performing the task, and updating the network device based on the result included in the task response.

In another embodiment, a network device includes at least one network interface configured to send and receive messages, a routing unit comprising one or more processors configured to execute a version of a network operating system, and a virtual machine executable by the routing unit. The virtual machine agent is configured to identify a virtual machine executing at a computing cloud communicatively coupled to the network device, wherein the identified virtual machine executes an instance of the version of the network operating system, to send, using the at least one network interface and to the virtual machine, a request to perform a task, and to receive, using the at least one network interface and from the virtual machine, a task response that includes a result of performing the task. The routing unit is configured to update the network device based on the result included in the task response.

In another embodiment, a computer-readable storage medium encoded with instructions executable by one or more processors to execute a version of a network operation system, and identify a virtual machine executing at a computing cloud communicatively coupled to the network device, wherein the identified virtual machine executes an instance of the version of the network operating system. The instructions are further executable to send, to the identified virtual machine, a request to perform a task, receive, from the virtual machine, a task response that includes a result of performing the task, and update, based on the result included in the task response, the network device.

The details of one or more embodiments are set forth in the accompanying drawings and the description below. Other features, objects, and advantages will be apparent from the description and drawings, and from the claims.

DETAILED DESCRIPTION

Figure 1:
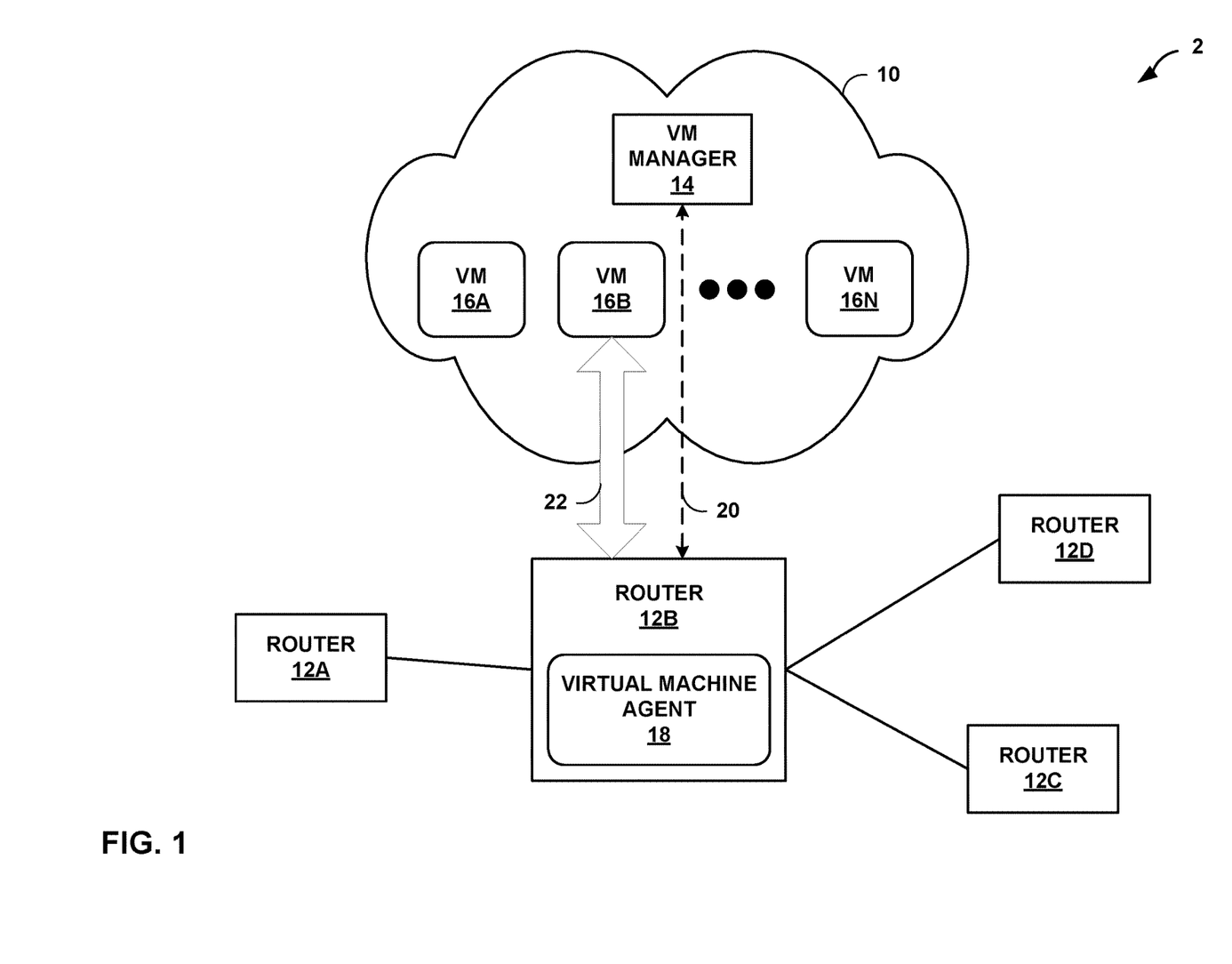
FIG. 1 is a block diagram illustrating an example system for distributing network device tasks across virtual machines, in accordance with one aspect of this disclosure.

FIG. 1 is a block diagram illustrating an example system for distributing network device tasks across virtual machines, in accordance with one aspect of this disclosure. As shown in FIG. 1, network system 2 includes computing cloud 10, routers 12A-12D (collectively, "routers 12"), virtual machine manager (VM MANAGER) 14, and virtual machines (VMs) 16A-16N (collectively, "virtual machines 16"). Computing cloud 10 hosts the computing resources that include virtual machine manager 14 and virtual machines 16. The computing resources of computing cloud 10 may be any computing resources capable of performing techniques of this disclosure. For example, computing cloud 10 may include server computers, desktop computers, portable computers, or any other device that, for example, includes a processor. While shown as distinct entities, virtual machine manager 14 and each of virtual machines 16 may be distributed across two or more different computing resources of computing cloud 10 and the number of virtual machines may be different from the number of different computing resources of computing cloud 10.

In some examples, two or more of virtual machines 16 may utilize, at least in part, the same computing resources. For example, virtual machine 16A may execute across three different servers and virtual machine 16B may execute on one of the three servers on which virtual machine 16A is executing. In some examples, multiple computing resources of computing cloud 10 may be configured as a cluster, providing additional redundancy and scalability while supporting multiple virtual machines. In general, each virtual machine 16 executes an instance of a network operating system. Typically, each network operating system instance corresponds to an operating system executing on network devices (e.g., routers 12) communicatively coupled to computing cloud 10.

In general, routers 12 exchange routing information with each other to maintain an updated view of the topology of the network. For example, router 12B receives a packet from router 12A, and based on routing information maintained by router 12B, forwards the packet to a next hop, such as router 12C. The task distribution techniques described in this disclosure enable each of routers 12 to perform various configuration and administrative tasks (e.g., executing routing protocols to update stored routing and forwarding information) with minimal utilization of the computing resources of the respective router 12, thereby enabling more computing resources of the respective router 12 to be utilized in forwarding packets and performing other latency-sensitive tasks.

Each of routers 12 executes an operating system that provides certain functionality to facilitate the forwarding and routing of packets across a network. Various different processes (sometimes referred to as daemons) execute within or as part of the operating system. Example processes include a chassis process that controls the chassis and its components, a device control process (i.e., an interface control process) that configures and monitors network interfaces, a forwarding process that is responsible for packet transmission, a management process, and a routing protocol process. The management process provides communication between the other processes, provides an interface to a configuration database, populates the configuration database with configuration information, interacts with the other processes when commands are issued through one of the user interfaces of a router 12, among other things. The routing protocol process defines how routing protocols, such as the routing information protocol (RIP), open shortest path first (OSPF) protocol, constrained SPF (CSPF), virtual private local area network service (VPLS), and border gateway protocol (BGP) operate on the device, including selecting routers and maintaining forwarding tables.

As shown in FIG. 1, router 12B includes virtual machine agent 18. As router 12B performs various tasks that may be offloaded to one or more virtual machines 16, virtual machine agent 18 manages the interaction between router 12B and computing cloud 10. For example, if router 12B updates a network map stored by router 12B, the creation of the network map and the calculation of next hops may be offloaded to one or more virtual machines 16. Virtual machine agent 18 sends a message to virtual machine manager 14 (i.e., using link 20) to request computational resources managed by virtual machine manager 14.

Virtual machine manager 14 manages the tasks sent to virtual machines 16 and stores configuration information about virtual machines 16. In some examples, each of virtual machines 16 registers with virtual machine manager 14. In other examples, virtual machine manager 14 actively queries computing cloud 10 to identify available virtual machines (e.g., virtual machines 16). The confirmation information stored by virtual machine manager 14 includes a version of an operating system executed at each virtual machine 16. The configuration information may also include the tasks each virtual machine 16 is configured to perform (e.g., network map generation, next-hop determination, etc.).

When virtual machine agent 18 sends a request for computational resources to virtual machine manager 14, virtual machine manager 14 determines if computing cloud 10 has resources available to perform tasks. If there computer cloud 10 has available computing resources, virtual machine manager 14 sends a response to router 12B indicating that computing cloud 10 can help. Virtual machine agent 18 sends a specific request for computing resource that includes the version of the operating system executed at router 12B and the task router 12B is requesting computing cloud 10 to perform. Virtual machine manager 14 identifies one of virtual machines 16 that is executing the appropriate version of the operation system, has available computing resources to perform the requested task, and includes the functionality required to perform the requested task (e.g., virtual machine 16B). Once virtual machine manager 14 identifies one of virtual machines 16 as being able to perform the requested task, virtual machine manager 14 sends a response message to virtual machine agent 18 indicating that computing cloud 10 can help.

Virtual machine agent 18 generates and sends a second request message to send to virtual machine manager 14. The second request message includes at least the version of the operating system executed by router 12B and information about the task on which router 12B is requesting assistance. Virtual machine manager 14 receives the second request message and determines whether any of virtual machines 16 support the version of the operating system specified in the request message and can perform the requested task. To identify an appropriate virtual machine 16, virtual machine manager 14 accesses the stored configuration information or sends a request for configuration information to at least one of virtual machines 16 (e.g., virtual machine 16B). Based on the configuration information, virtual machine manager 14 identifies at least one of virtual machines 16 and establishes a socket connection at the identified virtual machine 16. Virtual machine manager 14 sends a response message to virtual machine agent 18 that includes the socket connection information.

After receiving the response message from virtual machine manager 14, virtual machine agent 18 has the required configuration information to exchange messages with the identifier virtual machine 16 (e.g., virtual machine 16B) without exchanging additional messages with virtual machine manager 14. Using socket 22, virtual machine agent 18 exchanges messages with virtual machine 16B to cause virtual machine 16B to perform the requested tasks.

While the setup process described above includes two steps (first requesting if any computing resources are available and then providing the specific task requirements), in some examples, the setup process may be performed in a single step. For example, virtual machine agent 18 may send a single request message to virtual machine manager 14. The single request message includes the version of the operating system executed at router 12B and information about the task to be performed by computing cloud 10. Virtual machine manager 14 receives the single request message and determines if there are sufficient computing resources available within computing cloud 10. If there are not sufficient computing resources available, virtual machine manager 14 sends a response message to virtual machine agent 18 that computing cloud 10 cannot assist with the task at this time. If there are sufficient computing resources available, virtual machine manager 14 identifies one of virtual machines 16 (e.g., virtual machine 16B) that is executing the same version of the operation system and that can perform the requested task. Virtual machine manager 14 then establishes a socket (e.g., sets up a specific Internet Protocol (IP) address and port number) at virtual machine 16B for virtual machine agent 18 to use when exchanging messages required to perform the task, and sends a response message that includes the socket information. Virtual machine agent 18 can begin sending messages to virtual machine 16B, using the socket, in order to cause virtual machine 16B to perform the requested task without additional request and response messages exchanged between virtual machine agent 18 and virtual machine manager 14.

In some embodiments, virtual machine manager 14 may include socket information associated with two or more different virtual machines 16. In these embodiments, virtual machine agent 18 may divide up the task such that each of the two or more different virtual machines 16 perform at least one portion of the task. However, in some instances, even though virtual machine agent 18 received socket information for two or more different virtual machines 16, virtual machine agent 18 may select one of the virtual machines 16 to perform the entire task and discard or otherwise ignore the socket information included in the response for the other virtual machines.

In some examples, routers 12 may be included in one or more different logical segments of a network. For example, routers 12A and 12B may be part of a first logical segment while routers 12B, 12C, and 12D may be part of a second logical segment. In accordance with techniques of this disclosure, calculating the network map and shortest paths, in accordance with OSPF, for each logical segment may be performed by a different one of virtual machines 16. That is, when router 12B is configured to update the network map for each logical segment, virtual machine agent 18 may establish socket connections to two different virtual machines 16. Using the two different socket connections, virtual machine agent 18 sends a first set of received link-state messages for the first logical segment to a first virtual machine 16 (e.g., virtual machine 16A) and sends a second set of received link-state messages for the second logical segment to a second virtual machine 16 (e.g., virtual machine 16B).

In this manner, techniques of this disclosure enable virtual machines to be employed to provide logical segmentation of computing resources among a set of forwarding device (e.g., routers 12). The virtual machines can be created and distributed across the available computing resources of a computing cloud as required. Each virtual machine may be tasked with specific functions, such as running particular routing protocols or interface controls for a set of forwarding devices, while other virtual machines may provide management functionality. Further, because operations can take place within each virtual machine, multiple instances of a particular function can be simultaneously executed by multiple different virtual machines. That is, multiple control plane, data plane, and management plane processes, each using individual virtual machines. Thus, techniques of this disclosure enable the more efficient use of computing resources present within a forwarding device through a greater level of resource segmentation. In addition, while described with respect to a router that performs routing and forwarding functionality, the techniques may be applicable to other network devices including a layer three ("L3") switch, a layer three ("L2") switch, an L2/L3 switch, an OpenFlow switch, or another network device. In such examples, routing unit 30 may not necessarily include RP daemon 40 and instead offload RP daemon 40 functionality to VMs 16.

Figure 2:
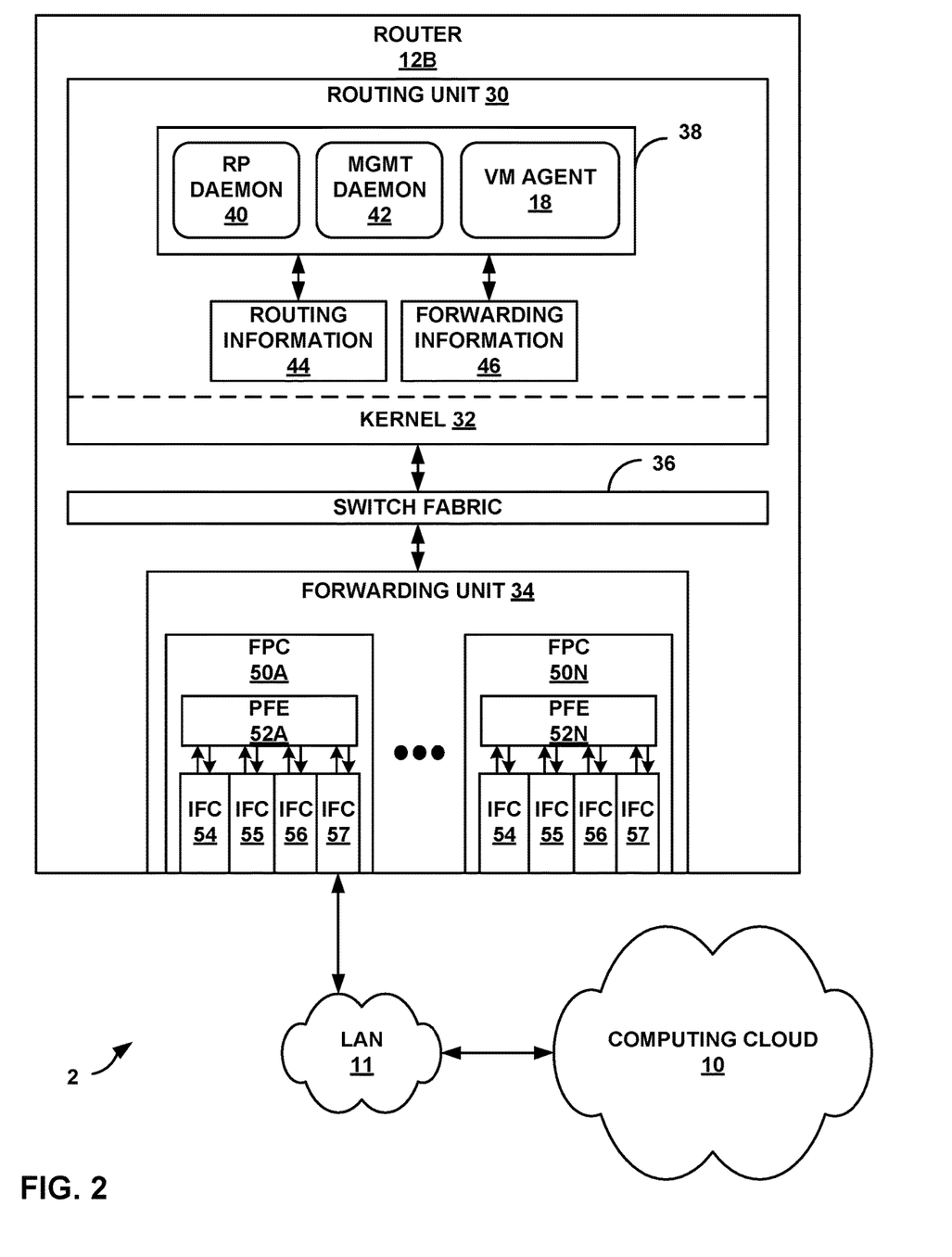
FIG. 2 is a block diagram illustrating further details of an example system for distributing network device tasks across virtual machines, in accordance with one aspect of this disclosure.

FIG. 2 is a block diagram illustrating further details of a portion of network system 2 shown in FIG. 1, in accordance with one aspect of this disclosure. As shown in FIG. 2, system 2 includes computing cloud 10, local area network (LAN) 11, and router 12B. Router 12B includes routing unit 30, forwarding unit 34, and switch fabric 36. Switch fabric 36 provides an interconnected set of flexible physical interface card ("PIC") concentrators 50A-50N ("FPCs 50"), each of which includes at least one of packet forwarding engines 52A-52N ("PFEs 52") that send and receive traffic by a set of interface cards ("IFCs") 54, 55, 56, and 57, respectively, that typically have one or more physical network interfaces (i.e., ports). Some of the PFEs 52 may send and receive traffic by tunnel PICs.

FPCs 50, components included in FPCs 50, and switch fabric 36 collectively provide a forwarding plane for forwarding transit network traffic. Although not shown in FIG. 2, PFEs 52 may each comprise a central processing unit (CPU), memory and one or more programmable packet-forwarding application-specific integrated circuits (ASICs). Switch fabric 36 provides a high-speed interconnect for forwarding incoming data packets between PFEs 52 for transmission over a network.

Routing unit 30 an operating environment for various protocols that perform control plane functions for router 12B. For example, daemons 38 comprise user-level processes that run network management software, execute routing protocols to communicate with peer routers, maintain and update one or more routing tables, and create one or more forwarding tables for installation to PFEs 52, among other functions. In the example illustrated in FIG. 2, daemons 38 include a routing protocol (RP) daemon 40, management (MGMT) daemon 42, and virtual machine (VM) agent 18. In other embodiments, daemons 38 may include other daemons or software modules, such as a chassis daemon, a configuration daemon, and a device control daemon.

Daemons 38 operate over and interact with kernel 32, which provides a run-time operating environment for user-level processes. Kernel 32 may comprise, for example, a UNIX operating system derivative such as Linux or Berkeley Software Distribution (BSD). In general, kernel 32 corresponds to a particular version of a network operating system. Kernel 32 offers libraries and drivers by which daemons 38 may interact with the underlying system. Kernel 32 comprises a kernel-level library, e.g., a sockets library, by which daemons 38 and other user-level processes or user-level libraries may interact with PFEs 52.

Routing protocol daemon 40 executes one or more interior and/or exterior routing protocols to exchange routing information with other network devices, store received information in routing information 44, and store derived forwarding information in forwarding information 46. Routing protocol daemon 42 configures the forwarding plane to implement packet-forwarding services, add/modify/delete routes, and otherwise modify packet forwarding paths by installing forwarding structures representing forwarding information 46 in PFEs 52.

The architecture of router 12B illustrated in FIG. 2 is shown for exemplary purposes only. The disclosure is not limited to this architecture. In other embodiments, router 12B may be configured in a variety of ways. In one embodiment, for example, some of the functionally of routing unit 30 may be distributed within PFEs 52. The operating environment of routing unit 30 may be implemented solely in software or hardware, or may be implemented as a combination of software, hardware or firmware. For example, routing unit 30 may include one or more processors that execute software instructions. In that case, routing unit 30 may include various software modules or daemons, e.g., daemons 38, executing on an operating system, and may include a non-transitory computer-readable storage device, such as computer memory or hard disk, for storing executable instructions.

A hardware environment of routing unit 30 may include one or more processors (not shown in FIG. 2) that execute program instructions in order to execute both kernel 32 and the operating environment of routing unit 30. The processor may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 12B, e.g., protocols. Routing unit 30, in some examples, retrieves and executes the instructions from memory for these aspects.

The techniques of this disclosure enable router 12B to distribute administrative tasks, routing protocol updates, or other tasks to virtual machines executing at computing cloud 10. As one example, router 12B utilizes OSPF to gather link state information from available routers and constructs a topology map of the network. When router 12B executes the OSPF to update the network topology without implementing task distribution techniques of this disclosure, a majority (e.g., eighty percent) of the computing resources of router 12B may be consumed during the update. However, by distributing at least some portions of the OSPF calculations to one or more virtual machines 16 (shown in FIG. 1), computing resources of computing cloud 10 are used, thereby reducing the amount computing resources of router 12B required to update the network topology.

In order to update the network topology, router 12B periodically identifies all other nodes (e.g., routers) to which router 12B is directly connected (i.e., routers 12A, 12C, and 12D shown in FIG. 1) by exchanging link-state advertisement messages with other routers in the network. Using the complete set of received link-state messages, router 12B creates a map of the network by iterating over the collection of link-state messages. For each received link-state message, router 12B makes a link on the map of the network between the router that sent the message and all the routers indicated in the message as being neighbors of the sending node.

Rather than routing process daemon 40 itself iterating over the collection of link-state messages and generating the map within routing unit 30, virtual machine agent 18 identifies a virtual machine of computing cloud 10 (e.g., virtual machine 16B shown in FIG. 1) that can generate the network map. In identifying the virtual machine, virtual machine agent sends a message to virtual machine manager 14 (FIG. 1) requesting assistance with a task. If computing cloud 10 has sufficient computing resources available, virtual machine manager 14 sends a response indicating that computing cloud 10 can assist with the task. Virtual machine agent 18 then sends a task request message that includes the version of the operating system executing at router 12B (e.g., the version of kernel 32 executing at routing unit 30) and specific information about the task (e.g., update network topology in accordance with OSPF). Virtual machine manager 14 determines whether any of virtual machines 16 are properly configured to perform the specified task. If there is at least one virtual machine 16 that is properly configured, virtual machine manager 14 establishes a socket at the virtual machine 16 (e.g., virtual machine 16B) and sends a response message to virtual machine agent 18 that includes the socket information.

Virtual machine agent 18 exchanges messages with each identified virtual machine 16 using the socket information received from virtual machine manager 14. That is, once the socket is established, virtual machine agent 18 may communicate with one or more of virtual machines 16 without having to send messages through virtual machine manager 14 (i.e., without virtual machine manager 14 acting as a relay). Continuing the example of updating the network map in accordance with OSPF, virtual machine agent 18 sends the received link-state messages to virtual machine 16B using the socket. Virtual machine 16B iterates over the link-state messages received from virtual machine agent 14 and generates a network map.

Once a complete map is generated, virtual machine 16B calculates the shortest paths between router 12B and other routers in the network. In one example, virtual machine agent 18 receives the complete map from virtual machine 16B. Typically, routing unit 30 and, more specifically, routing protocol daemon 40, applies an algorithm (e.g., Dijkstra's algorithm) to the map to determine the shortest path from router 12B to every other router in the network. In accordance with techniques of this disclosure, virtual machine agent 18 sends the complete network map to virtual machine 16B using the socket and requests that virtual machine 16B calculate the shortest paths, thereby freeing up computing resources of router 12B to perform other functions, such as packet forwarding. In another example, virtual machine 16B does not send the completed network map to virtual machine agent 18 and/or does not wait for additional instructions from virtual machine agent 18 and, instead, automatically begins determining the shortest paths once the network map generation process is complete. To calculate the shortest paths, virtual machine 16B generates a tree structure that contains all of the routers in the network and is organized such that the shortest path from router 12B to any other router is indicated by the list of nodes that are traversed to get from the root of the tree (i.e., router 12B) to the desired router. After the identified virtual machine 16 calculates the shortest paths, virtual machine 16B sends the completed tree of shortest paths to virtual machine agent 18. Virtual machine agent 18 receives the complete tree from virtual machine 16B and passes it to routing protocol daemon 40. Routing protocol daemon updates the routing information and forwarding information based on the completed tree.

While described with respect to calculating a network map and determining shortest paths to other routers in a network in accordance with OSPF, techniques of this disclosure may be applied to any administrative or other tasks including updating routing information in accordance with other routing protocols (e.g., RGP, BGP, IS-IS, spanning tree protocol, etc.) and performing various management tasks. Preferably, latency-sensitive tasks, such as determining next-hops during the forwarding of packets, are not distributed to one or more virtual machines 16 in computing cloud 10. However, it is contemplated that any task may be performed by one or more virtual machines 16 that are communicatively or operatively coupled to router 12B.

Figure 3:
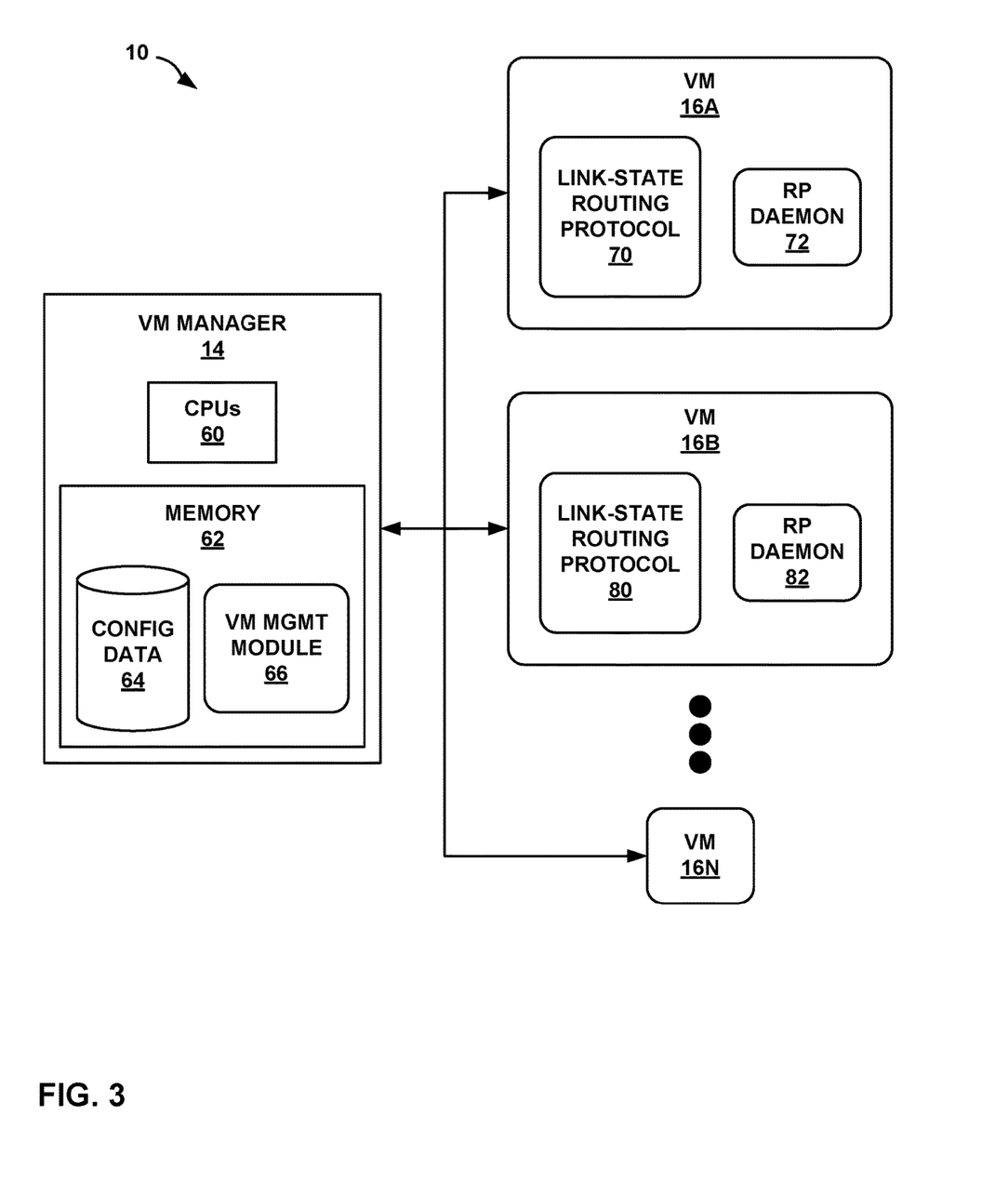
FIG. 3 is a block diagram illustrating an example computing cloud, in accordance with one aspect of this disclosure.

FIG. 3 is a block diagram illustrating an example computing cloud, in accordance with one aspect of this disclosure. Computing cloud 10 includes virtual machine manager 14 and virtual machines 16A-16N. In some embodiments, virtual machine manager 14 is a software processes executing within one of virtual machines 16. The computing resources of computing cloud 10 may include server computers, desktop computers, portable computers, or any other device that may execute a network operating system and perform one or more tasks associated with network devices. In some examples, two or more of virtual machines 16 may utilize, at least in part, the same computing resources. For example, virtual machine 16A and 16B may both be executing at a single server. A single virtual machine 16 may execute across two or more different computing resources. As an example, a plurality of conventional off-the-shelf computers may be configured as a cluster. The cluster of computers may execute a single virtual machine 16, providing additional redundancy and scalability while supporting multiple virtual machines. In general, each virtual machine 16 executes an instance of a network operating system, an instance of a networking device daemon (e.g., management daemon), and/or an instance of a routing protocol (e.g., OSPF, BGP, IS-IS, etc.).

Virtual machine manager 14 includes CPUs 60 and memory 62. CPUs 60 of virtual machine manager 14 are configured to execute instructions stored in memory 62. Memory 62 may comprise one or more computer-readable media, such as a non-transitory, computer-readable storage media. Examples of such media include RAM, ROM, NVRAM, EEPROM, flash memory, and other computer-readable storage media. Memory 62 includes configuration (CONFIG) data 64 and virtual machine management module (VM MGMT MODULE) 66. Configuration data 64 is one example of a data repository configured to store configuration information for virtual machines 16, including the capabilities and configurations of each of virtual machines 16.

VM management module 66, in some embodiments, is a software module executable by CPUs 60. In general, VM management module 66 manages the registration of virtual machines 16 as each virtual machine 16 is established and terminated. In other words, VM management module 66 updates configuration data 64 with configuration information for each virtual machine 16. For example, when virtual machine 16A is instantiated, virtual machine 16A registers with virtual machine manager 14 (e.g., by sending a message that includes an indication that virtual machine 16A came online and the configuration and/or capabilities of virtual machine 16A). VM management module 66 processes the virtual machine registration and stores the capabilities (e.g., the version of the operating system executing at the virtual machine, the software processes executing at the virtual machine, etc.) in configuration data 64. In response to one of virtual machines 16 terminating (i.e., shutting down), VM management module 66 removes the configuration information for the particular virtual machine 16 from configuration data 64.

In response to virtual machine manager 14 receiving a request from a network device (e.g., router 12B of FIG. 1), VM management module 66 queries configuration data 64 to determine if any virtual machines are currently executing. If there is no configuration information for virtual machines 16 in configuration data 64 (i.e., no virtual machines are currently executing), VM management module 66 generates a message indicating that computing cloud 10 cannot assist router 12B with the task. If there is configuration information for at least one virtual machine 16 in configuration data 64 (i.e., there is at least one virtual machine 16 executing), VM management module 66 generates a message indicating that computing cloud 10 has computing resources available and may be able to assist router 12B with the task. In some examples, even though no virtual machines 16 may be executing, if computing cloud 10 has available computing resources, VM management module 66 generates a message indicating that computing cloud 10 can assist router 12B with the task.

In examples where computing cloud 10 may assist router 12B with the task, virtual machine manager 14 receives a specific task request from router 12B. The specific task request includes details about the task for which router 12B is requesting assistance as well as the particular version of the network operating system executing at router 12B. VM management module 66 queries configuration date 64 to determine if any of virtual machines 16 are configured with the same version of the network operating system executed by router 12B and with the appropriate processes, daemons, or other capabilities required to complete the requested task.

If none of the virtual machines 16 are properly configured or if there are no virtual machines 16 currently executing, VM management module 66 may cause a new virtual machine 16 to be instantiated with the configuration required to perform the specified task. In general, virtual machines 16 are created and distributed across the computing resources of computing cloud 10 as required. Two or more of virtual machines 16 may each support an instance of a particular function (e.g., OSPF, interface control, etc.). Thus, router 12B may access multiple control planes, data planes, and management planes, each using an individual virtual machine 16.

If there is at least one virtual machine 16 (e.g., virtual machine 16A) that satisfies the requirements of the specified task, VM management module 66 establishes a socket to virtual machine 16A. In instances where there are two or more different virtual machines 16 that satisfy the requirements of the specified task (e.g., virtual machine 16A and 16B), virtual machine management module 66 may establish sockets at virtual machine 16A and 16B and pass all of the socket information back to virtual machine agent 18. As shown in FIG. 3, virtual machine 16A includes link-state routing protocol 70 and routing protocol (RP) daemon 72. Similarly, virtual machine 16B includes link-state routing protocol 80 and routing protocol (RP) daemon 82. In the example of FIG. 3, both virtual machine 16A and 16B can assist with link-state routing protocol calculations (e.g., OSPF, IS-IS, etc.).

In examples where two or more virtual machines 16 are identified (e.g., virtual machines 16A and 16B) and the specified task is performing OSPF calculations, each virtual machine may receive a portion of the received link-state messages such that virtual machine 16A iterates over a first portion of link-state messages and returns a partial map of the network while virtual machine 16B iterates over a second portion of the link-state messages and returns another partial map of the network. In some examples, either of virtual machines 16A and 16B may receive both partial maps from virtual machine agent 18 (FIG. 2) along with a request to generate a complete map based on the partial maps. Similarly, each of virtual machines 16A and 16B may perform a portion of the shortest path calculations.

In some embodiments, computing cloud 10 supports an open virtual machine hosting infrastructure to integrate third party virtual machines. In these embodiments, the third party virtual machines are not part of the native network operation system. To enable communication between virtual machines 16 and the third party virtual machines, the third-party virtual machines are treated as separate devices communicates with the native virtual machines using an application programming interface (API). The third party virtual machines may provide additional functionality not supported by the native virtual machines.

Figure 4:
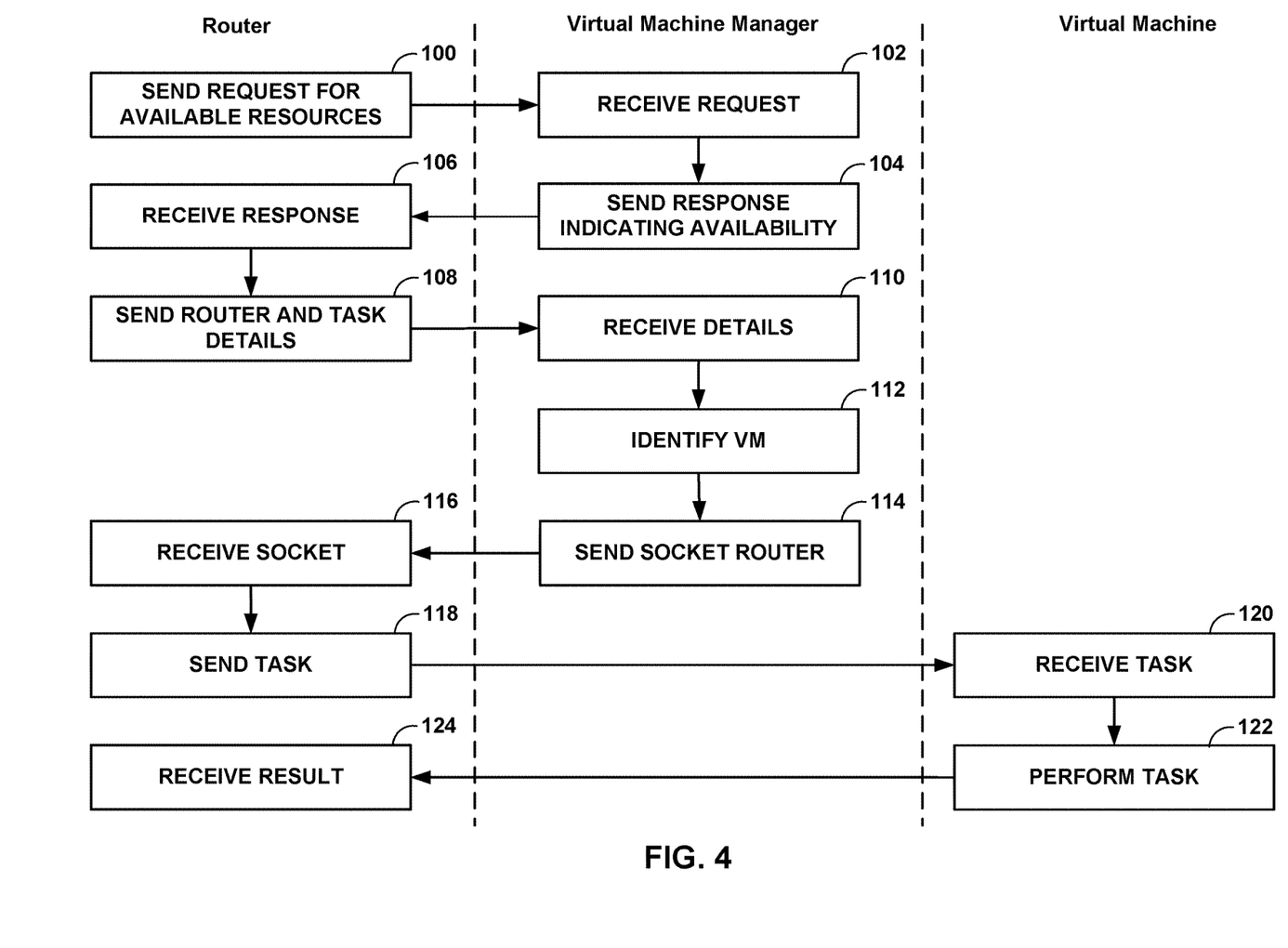
FIG. 4 is a flowchart illustrating an example process for distributing network device tasks across virtual machines, in accordance with one aspect of this disclosure.

FIG. 4 is a flowchart illustrating an example process for distributing network device tasks across virtual machines, in accordance with one aspect of this disclosure. For purposes of clarity, the process shown in FIG. 4 will be described with respect to system 2 of FIG. 1 and router 12B of FIG. 2. While described below with respect to routers and routing protocols, other embodiments of techniques of this disclosure may use other network devices and other processes, daemons, or network protocols.

Router 12B determines that one or more tasks need to be completed and virtual machine agent 18 sends a request to computing cloud 10 to determine whether computing cloud 10 may be able to perform at least a portion of the task (100). In some embodiments, router 12B and virtual machine manager 14 utilize a two-stage setup process to establish a connection between router 12B and one or more virtual machines 16. In these embodiments, the initial request message is a request to determine if computing cloud 10 has any available computing resources. Virtual machine manager 14 receives the request (102) and determines whether there are any virtual machines 16 currently executing and/or whether virtual machine manager 14 can instantiate any additional virtual machines within computing cloud 10.

Virtual machine manager 14 sends router 12B a response message indicating whether resources are available within computing cloud 10 (104).

Virtual machine agent 18 receives the response message from virtual machine manager 14 (106). If the response message indicates that there are no computing resources available in computing cloud 10, virtual machine agent 18 terminates the setup process and router 12B performs the task. If the response message indicates that there are computing resources available in computing cloud 10, virtual machine agent 18 generates a second request message that includes the version of the network operating system executing at router 12B and details of the requested task. In embodiments where router 12B and virtual machine manage 14 utilize a one-step setup process to establish a connection between router 12B and one or more virtual machines 16, the initial request message sent from router 12B to virtual machine manager 14 corresponds to the second request message. That is, in these embodiments, router 12B can skip the initial request message used in determining whether computing cloud 10 has sufficient computing resources available to assist in performing the task. Virtual machine agent 18 sends the second request message to virtual machine manager 14 (108).

Virtual machine manager 14 receives the second request message (110) and identifies one or more virtual machines 16 having the same version of the network operating system and capable of performing the task (112). One or more currently executing virtual machines 16 may be configured with the required version of the network operating system and with the required processes, daemons, or other capabilities needed to perform the task. However, if none of virtual machines 16 satisfy the requirements specified in the second requires message, virtual machine manager 14 can instantiate a new virtual machine 16 that satisfies the requirements and can perform the requested task. In response to identifying one or more virtual machines 16 that can perform the requested task, virtual machine manager 14 establishes a socket connection at each of the one or more identified virtual machines 16 and sends the socket information to router 12B (114).

In response to receiving the socket information (116), virtual machine agent 18 sends the specific task information (e.g., link-state messages, configuration information, etc.) to the one or more identified virtual machines 16 using the socket information (118). Each identified virtual machine 16 receives the task information (120) and performs the operations required to complete the task (122). After completing the task, the respective identified virtual machine 16 sends the task result to virtual machine agent 18 using the socket. Virtual machine agent 18 receives the result of the task (124) and router 12B applies the result of the task (e.g., routing unit 30 updates routing information 44 based on the result).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments have been described. These and other embodiments are within the scope of the following claims.

What is claimed is:

1. A method of distributed processing of network device tasks, the method comprising:
   receiving, by a virtual machine manager executing at a computing system and from a virtual machine agent executing at a router, a request for a computational resource of the computing system;
   determining, by the virtual machine manager, whether the computing system has at least one available computational resource; and
   responsive to determining that the computing system has at least one available computational resource:
   sending, by the virtual machine manager and to the router, a response indicating that the computing system has the at least one available computational resource;
   receiving, by the virtual machine manager, a request for a specific computational resource, the request for the specific computational resource including a version of an operating system executing at the router and a task the router is requesting the computing system perform, wherein the task is associated with a routing protocol executing at the router;
   identifying, by the virtual machine manager and based on the version of the operating system executing at the router, at least one virtual machine from a plurality of virtual machines executing at the computing system as a target virtual machine, wherein the target virtual machine executes an appropriate version of the operating system of the router and has available computing resources to perform the task; and sending, by the virtual machine manager and to the router, a response to the request for the specific computational resource, the response including socket connection information for the target virtual machine identified by the virtual machine manager.

2. The method of claim 1, further comprising:
prior to sending the response to the request for the specific computational resource:
  receiving, by the virtual machine manager from the virtual machine, a message that includes an indication that the virtual machine came online, configuration information of the virtual machine, and capabilities of the virtual machine; and
  storing, by the virtual machine manager and in a data repository, the configuration information of the virtual machine and the capabilities of the virtual machine,
  wherein identifying the virtual machine comprises:
    determining, based on the configuration information of the virtual machine and the capabilities of the virtual machine stored by the virtual machine manager, whether the virtual machine has a same version of the operating system and is capable of performing the task; and
    responsive to determining that the virtual machine has the same version of the operating system and is capable of performing the task, identifying the virtual machine as the target virtual machine.

3. The method of claim 2, further comprising:
responsive to the target virtual machine terminating executing:
  removing, by the virtual machine manager, the configuration information of the virtual machine and the capabilities of the virtual machine from the data repository.

4. The method of claim 1, further comprising:
when no virtual machines are currently executing at the computing system and responsive to receiving the request for the specific computing resource, initiating, by the virtual machine manager, execution of the virtual machine at the computing system.

5. The method of claim 1, further comprising:
responsive to determining that the computing system does not have at least one available computational resource, sending, by the virtual machine manager and to the router, a message indicating that the computing system cannot assist the router.

6. The method of claim 1,
wherein identifying the at least one virtual machine as the target virtual machine comprises identifying two or more virtual machines as two or more target virtual machines, wherein each of the two or more target virtual machines execute a same version of the operating system as the router, and wherein each of the two or more target virtual machines are configured to assist with at least a portion of the task,
the method further comprising:
  establishing a respective socket to each of the two or more target virtual machines,
  wherein the response includes respective socket connection information for each of the two or more target virtual machines.

7. The method of claim 1, wherein the routing protocol is one of open shortest path first, spanning tree protocol, border gateway protocol, intermediate system to intermediate system protocol, and virtual private local area network service.

8. The method of claim 1, wherein at least a subset of the plurality of virtual machines is configured to execute one or more of a routing protocol, an interface control process, a management process, and a chassis process.

9. A virtual machine manager comprising:
one or more processors; and
a memory that stores a virtual machine management module executable by the one or more processors to:
  receive, from a router, a request for a specific computational resource of a computing system, the request including a version of an operating system executing at the router and a task the router is requesting the computing system perform, wherein the task is associated with a routing protocol executing at the router;
  determine whether the computing system has at least one available computational resource; and
  responsive to determining that the computing system has at least one available computational resource:
    identify, based on the version of the operating system executing the router, at least one virtual machine from a plurality of virtual machines executing at the computing system as a target virtual machine, wherein the target virtual machine executes an appropriate version of the operating system of the router and has available computing resources to perform the task; and
    send, to the router, a response to the specific request, the response including socket connection information for the target virtual machine.

10. The virtual machine manager of claim 9, wherein the virtual machine management module is further executable by the one or more processors to:
prior to sending the response to the specific request:
  receive, from the virtual machine, a message that includes an indication that the virtual machine came online, configuration information of the virtual machine, and capabilities of the virtual machine; and
  store, in the memory, the configuration information of the virtual machine and the capabilities of the virtual machine;
determine, based on the configuration information of the virtual machine and the capabilities of the virtual machine stored in the memory, whether the virtual machine has a same version of the operating system and is capable of performing the task; and
responsive to determining that the virtual machine has the same version of the operating system and is capable of performing the task, identify the virtual machine as the target virtual machine.

11. The virtual machine manager of claim 10, wherein the virtual machine management module is further executable by the one or more processors to:
responsive to the target virtual machine terminating executing, remove the configuration information of the virtual machine and the capabilities of the virtual machine from the memory.

12. The virtual machine manager of claim 9, wherein the virtual machine management module is further executable by the one or more processors to:
when no virtual machines are currently executing at the computing system and responsive to receiving the request for the specific computing resource, initiate execution of the virtual machine at the computing system.

13. The virtual machine manager of claim 9, wherein the virtual machine management module is further executable by the one or more processors to:
responsive to determining that the computing system does not have at least one available computational resource, send, to the router, a message indicating that the computing system cannot assist the router.

14. The virtual machine manager of claim 9, wherein the virtual machine management module is further executable by the one or more processors to:
identify two or more virtual machines as two or more target virtual machines, wherein each of the two or more target virtual machines execute a same version of the operating system as the router, and wherein each of the two or more target virtual machines are configured to assist with at least a portion of the task; and
establish a respective socket to each of the two or more target virtual machines,
wherein the response includes respective socket connection information for each of the two or more target virtual machines.

15. The virtual machine manager of claim 9, wherein the routing protocol is one of open shortest path first, spanning tree protocol, border gateway protocol, intermediate system to intermediate system protocol, and virtual private local area network service.

16. The virtual machine manager of any of claim 9, wherein at least a subset of the plurality of virtual machines is configured to execute one or more of a routing protocol, an interface control process, a management process, and a chassis process.

17. A computer-readable storage medium encoded with instructions that cause one or more processors of a computing system:
receive, from a virtual machine agent executing at a router, a request for a specific computational resource of a computing system, the request including a version of an operating system executing at the router and a task the router is requesting the computing system perform, wherein the task is associated with a routing protocol executing at the router;
determine whether the computing system has at least one available computational resource; and
responsive to determining that the computing system has at least one available computational resource:
identify, based on the version of the operating system executing the router, at least one virtual machine from a plurality of virtual machines executing at the computing system as a target virtual machine, wherein the target virtual machine executes an appropriate version of the operating system of the router and has available computing resources to perform the task; and send, to the router, a response to the specific request, the response including socket connection information for the target virtual machine.

18. The computer-readable storage medium of claim 17, wherein the instructions further cause the one or more processors to:
prior to sending the response to the specific request:
receive, from the virtual machine, a message that includes an indication that the virtual machine came online, configuration information of the virtual machine, and capabilities of the virtual machine; and
store the configuration information of the virtual machine and the capabilities of the virtual machine;
determine, based on the configuration information of the virtual machine and the capabilities of the virtual machine, whether the virtual machine has a same version of the operating system and is capable of performing the task; and
responsive to determining that the virtual machine has the same version of the operating system and is capable of performing the task, identify the virtual machine as the target virtual machine.

19. The computer-readable storage medium of claim 17, wherein the instructions further cause the one or more processors to:
identify two or more virtual machines as two or more target virtual machines, wherein each of the two or more target virtual machines execute a same version of the operating system as the router, and wherein each of the two or more target virtual machines are configured to assist with at least a portion of the task; and
establish a respective socket to each of the two or more target virtual machines,
wherein the response includes respective socket connection information for each of the two or more target virtual machines.

20. The computer-readable storage medium of claim 17, wherein the routing protocol is one of open shortest path first, spanning tree protocol, border gateway protocol, intermediate system to intermediate system protocol, and virtual private local area network service, and
wherein at least a subset of the plurality of virtual machines is configured to execute one or more of a routing protocol, an interface control process, a management process, and a chassis process.

* * * * *